Patented Dec. 2, 1941

2,264,721

UNITED STATES PATENT OFFICE 2,264,721

FOODSTUFF AND METHOD OF MAKING SAME

Rosilda C. Savale, Orange, N. J.

No Drawing. Application December 29, 1938, Serial No. 248,178

8 Claims. (Cl. 99—90)

The invention relates to foodstuffs and the method of making same, and more particularly to a bread or like product containing a cereal flour and other non-starchy vegetable products rich in vitamins and iron not found in such cereal flours.

It is well recognized that spinach is one of the best of foods for human beings. It contains practically all of the known vitamins and is also rich in mineral salts, particularly iron. There is, however, a widespread repugnance, particularly on the part of children, to spinach as a vegetable. This may be due in part to the effort of adults to induce children to eat spinach upon the theory that it is beneficial to their health and physical development, and in part to the fact that spinach, when stewed or boiled, is lacking in a pleasing characteristic flavor and is not particularly palatable.

The main object of the invention is to provide a foodstuff containing spinach in a palatable form by reason of its being associated with wheat or other flours also containing high nutritive value, and other ingredients serving to modify or disguise the natural savor of the spinach in a manner to make the foodstuff pleasing to the taste and thus overcome the prejudices against same.

I have found that a bread or similar food product containing spinach, with all of its vitamins and all of its mineral salts, may be made, and that this bread, in addition to being extremely palatable, will, by reason of the spinach content, remain sweet and fresh over long periods of time, as compared with ordinary breads, without hardening or developing that peculiar flavor present in stale bread. In fact, bread embodying the invention will remain soft, fresh and sweet for from two to three weeks, although such a time interval is much greater than ordinarily would be desired.

In order to produce bread, biscuits and like articles of foodstuff having the desired properties and quality, I have found it necessary to mix with the dough, before baking the bread, raw or uncooked green spinach cut or ground into small particles, and to use the juice or liquor of the spinach in supplying moisture to the dough. By so doing, all of the constituents of the spinach found in the leaves and in the stems are utilized, and during baking, any of the constituents which would be lost when boiling or stewing or otherwise cooking spinach, are retained in the bread, either being absorbed by the flour or precipitated in the mass of the loaf. When the spinach is baked, it will retain much of its native moisture, and since it is dispersed throughout the dough, it will aid materially in preventing the drying out of the bread.

While white wheat, whole wheat, rye or corn flour may be used in making the bread or other similar product, I have obtained the best results using ordinary white wheat flour. In making a single large loaf of bread I have used the following materials in the manner and the quantities stated:

4 level cups of flour.
1 cup of finely divided and crushed spinach and the sap or liquor therefrom.
2 level tablespoons of granulated sugar.
1 level tablespoon of salt.
1 tablespoon of butter, lard or other fatty matter as a substitute therefor.
½ of a cake of yeast.

These materials are compounded in the following manner:

Green spinach, after being washed and drained, is cut up or finely divided and crushed by passing it through an ordinary meat chopper or other cutting device, preferably using a plate having fine holes. The liquor or juice from the spinach has added thereto a small quantity of water or milk, ordinary table salt, sugar and fat in about the proportions stated. The mixture is then brought to the boiling point and allowed to cool for a short time, say substantially ten minutes. While still warm, the ground spinach is added and the mixture allowed to stand until it is tepid. Salt is used in sufficient quantity to draw juice or liquor from the raw or green spinach in excess of that expressed during cutting and crushing. The yeast cake is then dissolved in warm water in the usual manner and added to the above mixture. Flour is then added to the mixture until a spongy dough is formed. The dough may be kneaded or otherwise worked to ensure the dispersion of the particles of spinach throughout the batch, and then placed in a warm spot and allowed to raise in a manner common in the making of bread. After raising, the dough is again kneaded and additional flour added, and again allowed to raise while in the final form of the product in the bake pan, for proofing.

When the dough has raised to about twice the size of what it was when placed in the pan, it is placed in the oven and baked for about an hour, first with a quick oven and then with a slower oven. It will be noted that when the dough is placed in the oven the spinach is still raw or uncooked.

The above procedure and the proportions of the various ingredients as given above may be varied according to the texture desired in the finished product, and according to the kind of flour used, but such variation will not depart from those variations common with different kinds of flour. Whatever the procedure and whatever the quantities, it is essential that when the raised dough is placed in the oven, the spinach thoroughly dispersed throughout same must be raw or uncooked, thus ensuring in the finished product the presence of all of the vitamins and most of the mineral salts inherent to spinach. It is also necessary that the juice or liquor of the spinach be used in making the dough originally, since this material also contains some of the natural constituents of spinach.

While it is necessary to bring this liquor or juice to substantially the boiling point of water when mixing it with the salt, sugar and fat, there will be little loss of nutriment from this procedure. This will bring every small particle of the spinach into intimate contact with the juice or liquor and salt, sugar and fat incorporated therein, thus coating or permeating each particle of the spinach with such mixture so as to make it more palatable and destroy any objectionable characteristic flavor. While it is true that much of the seasoning matter will be absorbed by the flour and mixes with the dough before or during baking, nevertheless it will always be present about the spinach so as to secure the desired effect of making the product palatable, even to those who ordinarily dislike spinach.

In making bread of one texture it is necessary only to add water to the spinach liquor or juice, although, as stated, if desired milk may be substituted for water where bread of another texture is desired. Whether water or milk is used, however, is immaterial to the invention, since this is solely for the purpose of supplementing the liquor or juice of the spinach to provide the necessary amount of fluid for mixing the dough.

The resulting product is a breadstuff differing but little in appearance from ordinary bread, except that when it is cut it has a slight green tint, due to the presence of the spinach. If properly mixed, there will be no substantial lumps of spinach. This is due to the addition of the ground spinach to the liquor or juice prior to the mixing of the flour therewith.

The baking will cook the spinach while completely surrounded by the flour in the dough, and hence all nutritious vitamins, salts and other substances in the spinach which may be released as a result of the application of heat will be retained in the loaf, and this applies also to the spinach liquor or juice.

The bread is in no sense soggy, nor does it become soggy with age. The salt, sugar and fats incorporated in the dough aid in destroying whatever spinach flavor might be present in the finished product and tend, by combination with the spinach, to make the bread more palatable. There is no indication of that slight bitterness characteristic of spinach.

The product essentially is a foodstuff consisting of bread or like food material composed of baked flour dough, finely divided particles of spinach and all of the vitamins and salts of the spinach dispersed throughout the dough, and seasoning for modifying the savor of the spinach and other constituents.

It is not my intention to limit the invention to the exact proportions of ingredients, or the exact ingredients herein stated, since different flours may be used and the proportions given may be varied while still securing a palatable, highly nutritious product.

It will be noted that in the example given, the quantity of spinach, including its liquor or juice, is substantially in the ratio of 1 to 4 of the flour. The salt, sugar and fat may be varied in quantity according to the taste of the maker of the bread.

Having described the invention, what I claim as new and desire to have protected by Letters Patent, is:

1. A foodstuff consisting of breadstuff composed of baked flour dough containing finely divided particles of green spinach and all of the vitamins, the juices and salts of green spinach dispersed throughout and baked with the same, and seasoning for modifying the savor of the spinach and other constituents.

2. A foodstuff consisting of breadstuff composed of baked flour dough containing finely divided particles of green spinach, the juice or liquor derived from raw green spinach and all of the vitamins and salts of green spinach dispersed throughout and baked with the same, and a mixture of sugar, salt and fatty material about the finely divided particles of spinach.

3. A foodstuff consisting of breadstuff composed of baked raised flour dough containing finely divided particles of green spinach and all of the vitamins, the juices and salts of green spinach dispersed throughout and baked with the same, and seasoning for modifying the savor of the spinach and other constituents.

4. A foodstuff consisting of breadstuff composed of baked raised flour dough containing finely divided particles of green spinach, the juice or liquor derived from raw green spinach and all of the vitamins and salts of green spinach dispersed throughout and baked with the same, and a mixture of sugar, salt and fatty material about the finely divided particles of spinach.

5. A foodstuff consisting of breadstuff composed of baked flour dough containing finely divided particles of green spinach and all of the vitamins, the juices and salts of green spinach dispersed throughout and baked with the same, and seasoning for modifying the savor of the spinach and other constituents, the proportion of flour to the spinach mixture being substantially four to one by bulk.

6. The herein described method of making breadstuffs consisting in cutting raw green spinach into small particles and expressing some of the juice or liquor therefrom, adding to said juice or liquor, a fluid, salt, sugar and a fatty substance, raising the temperature of said mixture, adding the small particles of spinach to the mixture while at a low temperature, thereafter adding a ferment and flour to form a spongy dough, allowing the dough to raise, adding additional flour, and after proofing baking.

7. The herein described method of making breadstuffs consisting in cutting raw green spinach into small particles and expressing some of the juice or liquor therefrom, adding to said juice or liquor, a fluid, salt, sugar and a fatty substance, raising the temperature of said mixture, adding the small particles of spinach to the mixture while at a low temperature, thereafter adding a ferment and flour in a proportion of substantially four to one of the spinach mixture to form a spongy dough, allowing the dough to raise, adding additional flour, and after proofing baking.

8. The herein described method of making breadstuffs consisting in cutting raw green spinach into small particles and expressing some of the juice or liquor therefrom, adding to said juice or liquor, a fluid, salt, sugar and a fatty substance, raising the temperature of said mixture, adding the small particles of spinach to the mixture while at a low temperature, the salt, sugar and fatty material being in the proportion of substantially one teaspoonful of salt, two tablespoonfuls of sugar and one tablespoonful of fatty material to each cupful of the spinach mixture, thereafter adding a ferment and flour in a proportion of substantially four to one of the spinach mixture to form a spongy dough, allowing the dough to raise, adding additional flour, and after proofing baking.

ROSILDA C. SAVALE.